United States Patent
Zhang et al.

(10) Patent No.: US 9,478,782 B2
(45) Date of Patent: Oct. 25, 2016

(54) LITHIUM AIR BATTERY HAVING A CROSS-LINKED POLYSILOXANE SEPARATOR

(75) Inventors: Zhengcheng Zhang, Naperville, IL (US); Khalil Amine, Oak Brook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 851 days.

(21) Appl. No.: 13/606,290

(22) Filed: Sep. 7, 2012

(65) Prior Publication Data
US 2014/0072884 A1    Mar. 13, 2014

(51) Int. Cl.
| | | |
|---|---|---|
| *H01M 2/16* | (2006.01) |
| *B32B 37/14* | (2006.01) |
| *C08G 77/38* | (2006.01) |
| *H01M 4/04* | (2006.01) |
| *H01M 8/22* | (2006.01) |
| *H01M 2/14* | (2006.01) |
| *H01M 12/08* | (2006.01) |
| *C09D 183/12* | (2006.01) |
| *H01M 4/86* | (2006.01) |
| *H01M 4/98* | (2006.01) |
| *C08G 77/12* | (2006.01) |
| *C08G 77/14* | (2006.01) |
| *C08G 77/46* | (2006.01) |

(52) U.S. Cl.
CPC .......... *H01M 2/1673* (2013.01); *C09D 183/12* (2013.01); *H01M 2/145* (2013.01); *H01M 2/1653* (2013.01); *H01M 2/1686* (2013.01); *H01M 12/08* (2013.01); *C08G 77/12* (2013.01); *C08G 77/14* (2013.01); *C08G 77/38* (2013.01); *C08G 77/46* (2013.01); *H01M 4/8605* (2013.01); *H01M 4/98* (2013.01); *Y10T 156/10* (2015.01)

(58) Field of Classification Search
None
See application file for complete search history.

(56) References Cited

U.S. PATENT DOCUMENTS

| | | | | |
|---|---|---|---|---|
| 6,096,453 | A | * | 8/2000 | Grunwald ..................... 429/212 |
| 7,211,351 | B2 | | 5/2007 | Klaassen |
| 7,344,804 | B2 | | 3/2008 | Klaassen |
| 2003/0198869 | A1 | * | 10/2003 | West et al. .................... 429/313 |
| 2007/0172739 | A1 | * | 7/2007 | Visco et al. .................. 429/322 |
| 2010/0062342 | A1 | * | 3/2010 | Li ................................. 429/254 |
| 2010/0104948 | A1 | | 4/2010 | Skotheim |
| 2011/0008677 | A1 | * | 1/2011 | Nakane et al. ............ 429/218.1 |
| 2011/0177400 | A1 | * | 7/2011 | Chua ................... H01M 2/0277 429/405 |
| 2011/0200891 | A1 | * | 8/2011 | Kotani et al. ................. 429/403 |
| 2012/0321968 | A1 | * | 12/2012 | Sato et al. ..................... 429/403 |

FOREIGN PATENT DOCUMENTS

WO    WO2011087089    *    7/2011

OTHER PUBLICATIONS

Crowther et al., "Oxygen Selective Membranes for Li-Air (O2) Batteries," May 11, 2012, Membranes, 2, pp. 216-227.*

\* cited by examiner

*Primary Examiner* — Ula C Ruddock
*Assistant Examiner* — Matthew Van Oudenaren
(74) *Attorney, Agent, or Firm* — Foley & Lardner LLP

(57) ABSTRACT

A lithium-air battery includes a lithium anode; an air cathode; and a separator between the lithium anode and an air cathode the separator including a cross-linked polysiloxane.

26 Claims, 2 Drawing Sheets

LITHIUM AIR BATTERY HAVING A CROSS-LINKED POLYSILOXANE SEPARATOR

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to separators for lithium-air batteries.

BACKGROUND

Lithium, the lightest alkali metal, has the lowest electro negativity. Its gravimetric electrochemical equivalence of 3.86 Ah/g is the highest among all metallic anode materials. Coupling a lithium anode with an air (oxygen) cathode can provide for very light, high energy density batteries. However, a significant hurdle to the commercialization of this technology is the difficulty in preventing dendridic lithium growth inside the cells of the battery during cycling.

During discharging the lithium in a lithium-air battery migrates from the anode to the cathode. Upon charging, the lithium is transferred back to the anode, however, the re-formation of the lithium at the anode is not uniform. During cycling, dendrimers of lithium form as radiating filaments from the lithium anode, eventually penetrating through the porous separator between the anode and cathode, and eventually contacting the cathode. The result is a shorting of the cell. This leads to eventual cell failure and potential violent reactions with liquid electrolytes. Consumption of liquid electrolyte via reactions with high surface area dendritic lithium during cycling is also a source of capacity fade in lithium air cells.

In lithium-air cells, the protection of the lithium anode from the air and moisture is of great concern. As noted, the cells employ a separator between the lithium anode and the air cathode, where the separator allows for lithium ion migration while preventing or minimizing oxygen and water incursion to the cell. One common material for preparation of the separator for lithium-air cells is known as a lithium super-ionic conductor (LiSICON) film. LiSICON ($Li_2O$—$Al_2O_3$—$SiO_2$—$P_2O_5$—$TiO_2GeO_2$; or generally ($Li_{1+x+y}Al_x(Ti,Ge)_{2-x}Si_yP_{3-y}O_{12}$) exhibits a lithium ion conductivity of $1\times10^{-4}$ S/cm at 25° C. In the LiSICON, x may from 0 to 0.4, inclusive, and y may be greater than 0 and less than or equal to 0.6. While LiSICON allows for high lithium ion conductivity, it does not prevent dendritic lithium formation upon charging of the cell, and it is fragile and expensive material.

SUMMARY

In one aspect, a lithium-air battery includes a lithium anode; an air cathode; and a separator between the lithium anode and an air cathode, where the separator includes a cross-linked polysiloxane. The separator allows for the conductance of lithium ions, while preventing oxygen incursion into the battery. In one embodiment, the separator is a coating on a surface of the lithium anode. In such an embodiment, the coating will include one or more layers of the cross-linked polysiloxane on the surface of the lithium anode.

In one embodiment, the separator further includes a ceramic having a first surface and second surface, and the separator is disposed in the lithium-air battery, wherein the first surface is proximal to the lithium anode, and the second surface is proximal to the air cathode. In such embodiments, the cross-linked polysiloxane may be laminated to the first surface in one or more layers of the cross-linked polysiloxane. In any of the above embodiments, the ceramic includes a glass or ($Li_{1+x+y}Al_x(Ti,Ge)_{2-x}Si_yP_{3-y}O_{12}$), where x is $0\leq x\leq 0.4$, and y is $0<y\leq 0.6$. In one embodiment, the ceramic is $Li_2O$—$Al_2O_3$—$SiO_2$—$P_2O_5$—$TiO_2GeO_2$.

In another embodiment, the separator includes an interpenetrating network polymer including the cross-linked polysiloxane and a second, cross-linked polymer. The second, cross-linked polymer includes a poly(meth)acrylate, a polyolefin, or a polyurethane.

In another embodiment, the separator includes a film of the cross-linked polysiloxane and a film of a second, cross-linked polymer, wherein the films are laminated together. The second, cross-linked polymer may include a poly(meth)acrylate, a polyolefin, or a polyurethane.

In any of the above embodiments, the air cathode includes a porous carbon material.

In another aspect, a process for preparing a separator including a cross-linked polysiloxane. The process includes providing a polysiloxane having Si—H groups; contacting the polysiloxane with a cross-linker, an olefinic polyethylene oxide, and a catalyst to form a polymerization mixture; heating the polymerization mixture to form a cross-linked polysiloxane. In another embodiment, the cross-linker is $H_2C=CHCH_2O(CH_2CH_2O)_qCH_2CH=CH_2$ or $R^2C=CR^3C(O)(OCH_2CHX)_{n'}EC(O)CR^4=CR^5$, wherein $R^2$ and $R^5$ are individually H or $C_1$-$C_{12}$, $R^3$ and $R^4$ are individually H, $C_1$-$C_{12}$ alkyl, or $C_2$-$C_{12}$ alkenyl group, X is H or methyl group, E is $CH_2$ or O, n' is 1 to 15, and q is 1 to 15. In any of the above embodiments, the olefinic polyethylene oxide is $H_2C=CHCH_2O(CH_2CH_2O)_pCH_3$, and p is 1 to 15. In any of the above embodiments, the polysiloxane including Si—H groups is —[Si($R^1$)(H)O]$_n$—; $R^1$ is H or $C_1$-$C_{12}$ alkyl, and n is from 3 to 100.

In some embodiments, the process may further include laminating the cross-linked polysiloxane to a second polymeric material. In other embodiments, the second polymeric material is a poly(meth)acrylate, a polyolefin, or a polyurethane.

In another embodiment, the process may also include coating a lithium anode with the polymerization mixture prior to heating.

In another embodiment, the process may also include coating at least one surface of a ceramic with the cross-linked polysiloxane. Alternatively, the process may further include coating at least one surface of a ceramic separator with the polymerization mixture prior to heating.

DETAILED DESCRIPTION

Figure 1:
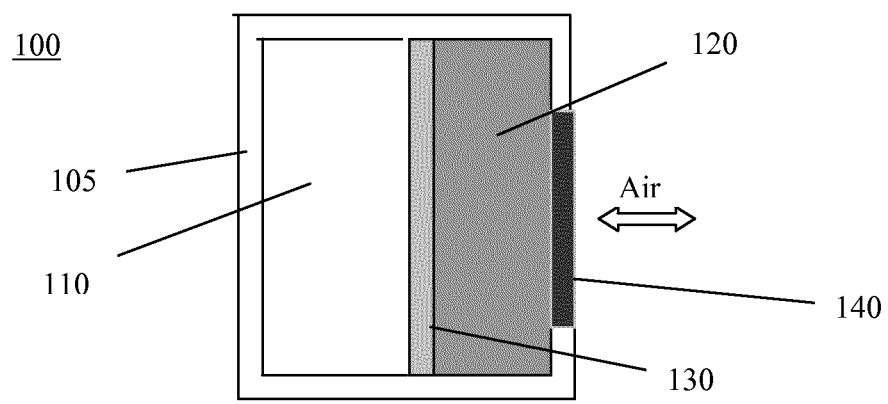
FIG. 1 is an illustration of a lithium-air cell, according to one embodiment.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl or alkenyl group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, $CH-CH=CH_2$, $C=CH_2$, or $C=CHCH_3$.

In one aspect, a separator is provided for use in a lithium-air battery. In a typical lithium air battery, there is an electrolyte, an anode which is lithium metal, and an air cathode. The separators protect the lithium anode and allow for lithium ion transfer from the anode to the cathode and back upon recharging.

The separators incorporate a cross-linked polysiloxane polymer membrane. The membrane is a solid electrolyte separator, which suppresses lithium dendrite growth, and limits moisture and air infiltration into the cell. The membranes provide for a more facile manner of incorporating a separator into a lithium-air cell, as well as providing a more economical and robust solution to lithium-air separators in comparison to the state of the art LiSICON membranes. For example, the cross-linked polysiloxane polymer membranes are less expensive and less brittle that separators made of ceramic glass or LiSICON.

The structure of batteries incorporating the cross-linked polysiloxane membrane fall into four categories. In the first category, a solid, cross-linked polysiloxane membrane is employed as the separator that separates the battery cell contents from the air cathode, allowing for air infiltration into the cell at a controlled rate. The second category of battery is one in which one or more layers of the cross-linked polysiloxane are formed on, or laminated to, the surface of the lithium anode. In such a structure, a separate, ceramic separator may be, or may not be used to further separate the cell contents from the air cathode, while preventing reaction between the lithium anode and the ceramic separator and minimizing infiltrating dendrimer growth of the lithium into the ceramic separator upon charging. For example, where the ceramic separator is, without limitation a glass or LiSICON, the cross-linked polysiloxane on the lithium anode prevents potential reactions between the lithium and the glass or LiSICON. Where the cell does not include a ceramic separator, the cross-linked polysiloxane coated on the lithium anode is the separator for the cell. The third category of the battery includes one or more layers of the cross-linked polysiloxane on a ceramic separator, such as, but not limited to, a glass or LiSICON. The fourth category is where both the lithium anode and the ceramic separator are coated with a cross-linked polysiloxane.

In one aspect, a lithium-air cell includes a lithium anode; an air cathode; and a separator comprising a cross-linked polysiloxane membrane. The cross-linked polysiloxane membrane includes a polyalkylene oxide-containing silane or siloxane polymer that is cross-linked with a cross-linking agent. As an illustration of a cross-linked polysiloxane material, the following is representative:

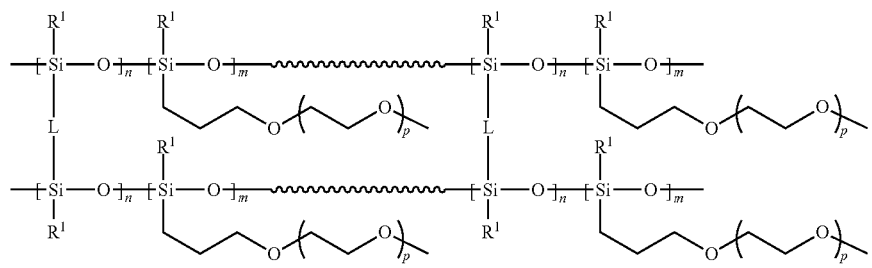

In the above cross-linked structure, L is a cross-linking group, and each $R^1$ is individually H, alkyl, or alkoxy. For example, $R^1$ may be H, $C_1$-$C_{12}$ alkyl, or $C_1$-$C_{12}$ alkoxy. In some embodiments, $R^1$ is methyl. In the cross-linked polysiloxane polymer, a portion of the silicon atoms in the backbone of the siloxane are substituted by polyethylene oxide groups, and some of the silicon atoms in the backbone are substituted with the cross-linker. The cross-linking agent used to form L may be polyfunctional linker group having at least two olefinic groups. For example, the cross-linking agent may be $H_2C=CHCH_2O(CH_2CH_2O)_qCH_2CH=CH_2$, $R^2_2C=CR^3C(O)(OCH_2CHX)_nEC(O)CR^4=CR^5$, or $H_2C=CH-CH_2-[Si(CH_3)_2O]_rSi(CH_3)_2-CH_2-CH=CH_2$ where $R^2$ and $R^5$ are individually H or $C_1$-$C_{12}$, $R^3$ and $R^4$ are individually H, $C_1$-$C_{12}$ alkyl, or $C_2$-$C_{12}$ alkenyl group, X is H or methyl group, E is $CH_2$ or O, n' is 1 to 15, q is 1 to 15, and r indicates the siloxane repeat unit in the oligomer. In some embodiments, r may be from 2 to about 1000. In the cross-linked polysiloxane polymer, n, m, and p indicate the individual repeat units and are not particularly limited. However, each m is individually from 1 to 50, each n is individually from 1 to 50, each n' is individually from 3 to 100, each p is individually from 1 to 13, and each q is individually from 1 to 16.

The cross-linked polysiloxane membrane may also be incorporated into an interpenetrating polymer network (IPN) with other polymeric materials. As used herein, an IPN refers to a mixture of two or more polymers that are intertwined and/or looped together. In such IPNs, the cross-linked polysiloxane may be intermixed with a poly(meth) acrylate, polyolefin, polyurethane, polyester, polycarbonate, or polyethyleneoxide (PEO). As used herein, the term "poly (meth)acrylates" generally refers to both polyacrylates, polymethacrylates, and co-polymers or blends thereof. In some embodiments, the cross-linked polysiloxane membrane is an IPN with a poly(meth)acrylate such as polymethylmethacrylate. In some embodiments, the cross-linked polysiloxane membrane is an IPN with a polyolefin. Illustrative (meth)acrylates include, but are not limited to ethyl acrylate, ethyl methacrylate, methyl methacrylate, vinyl acetate, methyl acrylate, 2-hydroxyethyl methacrylate, 2-hydroxyethyl acrylate, glycidyl acrylate, glycidyl methacrylate, propyl acrylate, propyl methacrylate, (polyethylene glycol)methyl ether acrylate, or (polyethylene glycol)methyl ether methacrylate. The poly(meth)acrylate may include one, two, three, four, or more different (meth)acrylate monomers. Illustrative polyolefins include, but are not limited to polyethylene, polypropylene, polybutylene, polyisobutylene, polyethyleneterephthalate, and PEO.

The separator may also include a cross-linked polysiloxane membrane that is laminated to a second polymeric material. Thus, the cross-linked polysiloxane may form a membrane that is to be in contact with the lithium anode side of the cell, while the second polymeric material provides structural resilience and rigidity for contact with the air side of the cell. The second polymeric material may be a poly (meth)acrylate, polyolefin, polyimide or polyurethane. In some embodiments, the separator includes a cross-linked polysiloxane membrane laminated to a poly(meth)acrylate substrate such as polymethylmethacrylate (PMMA). In some other embodiments, the separator includes a cross-linked polysiloxane membrane laminated to a polyolefin such as, but not limited to polyethylene or polypropylene.

As described above, the cross-linked polysiloxane membrane may be the separator for the lithium-air battery. In such a battery, a lithium anode is encased in a battery housing that includes the housing material and the separator. Referring to FIG. 1, such a battery 100 includes a housing 105, a lithium anode 110, an air cathode 120, and a separator 130 that is a cross-linked polysiloxane membrane. The air cathode 120 typically includes a current collector, a porous carbon material and a binder, and may optionally include a metal oxide. The battery 100 may also include a porous membrane 140 as a protective covering over the air cathode 120, but through which air can pass so that oxygen may reach the separator for reaction with the lithium to produce a current.

As eluded to above, the separator 130 may be entirely the cross-linked polysiloxane membrane, an IPN including the cross-linked polysiloxane membrane, a porous separator that is impregnated with the cross-linked polysiloxane, a ceramic that is coated with the cross-linked polysiloxane membrane on at least one side, or a cross-linked polysiloxane membrane that is laminated with a second polymeric material.

The current collector of the air cathode 120 may include copper, stainless steel, titanium, tantalum, platinum, gold, aluminum, nickel, cobalt nickel alloy, highly alloyed ferritic stainless steel containing molybdenum and chromium; or nickel-, chromium-, or molybdenum-containing alloys. The current collector may be a foil, mesh, or screen, and the porous carbon material and optional metal oxide are contacted with the current collector by casting, pressing, or rolling the mixture thereto. A binder may also be incorporated to retain the materials in contact with the current collector. The porous carbon material may include microporous carbon, mesoporous carbon, mesoporous microbeads, graphite, expandable graphite, carbon black, or carbon nanotubes. Commercial examples of carbon black include, but are not limited to, Super P, Black Pearl 2000, Denka Black, Vulcan XC72R, Ketjen black. The binder may include poly(acrylonitrile), poly(vinylidene fluoride), polyvinyl alcohol, polyethylene, polystyrene, polyethylene oxide, polytetrafluoroethylene, polyimide, styrene butadiene rubber, carboxy methyl cellulose, gelatin, or a copolymer of any two or more such polymers.

The optional metal oxide in the air cathode 120 is used for promoting the reaction of the air with the lithium and the decomposition of the discharged product back to its original state. Suitable metal oxide include, but are not limited to, $MnO_2$, $Fe_3O_4$, PdO, NiO, $Ni_2O_3$, $Co_3O_4$, CuO, and $TiO_2$.

In another embodiment, the separator may be a coating of the cross-linked polysiloxane polymer membrane on the surface of the lithium anode. The coating may be as one or more layers that either encase the anode, or are deposited on the separator side of the anode.

In another aspect, a process of preparing a lithium-air battery includes preparing a separator that includes a cross-linked polysiloxane membrane. The separator is prepared via a hydrosilylation reaction between a polysiloxane precursor, and an olefinic ethylene oxide, in the presence of a catalyst to form a polyethylene oxide siloxane. The polyethylene oxide siloxane is either concurrently, or stepwise, cross-linked by reaction of the polyethylene oxide silane, again in the presence of a catalyst. Such reactions are illustrated in Schemes 1 and 2. Scheme 1 illustrates the concurrent preparation of the cross-linked polysiloxane from all of the individual starting materials, while Scheme 2 illustrates the stepwise formation of the polyethylene oxide siloxane and then the cross-linking to form a solid polymer electrolyte (SPE). The cross-linked polysiloxane membrane may include any co-polymer or blend of such co-polymers.

Scheme 1:

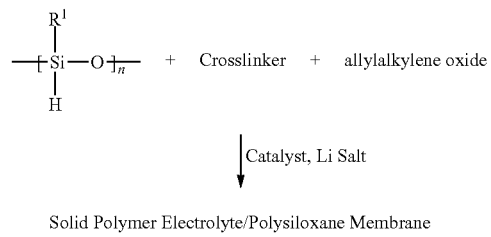

Scheme 2:

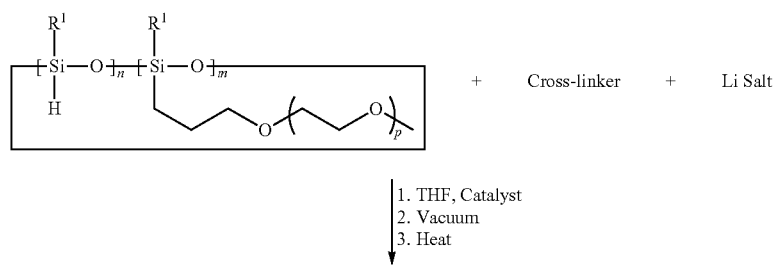

In Schemes 1 and 2, each $R^1$ is individually H, alkyl, or alkoxy. For example, $R^1$ may be H, $C_1$-$C_{12}$ alkyl, or $C_1$-$C_{12}$ alkoxy. In some embodiments, $R^1$ is methyl. As illustrated, only a portion of the silanes in the backbone of the siloxane are substituted by polyethylene oxide groups, so that some silane functionality remains for cross-linking. The cross-linker may be polyfunctional linker group having at least two olefinic groups. For example, the cross-linking agent may be $H_2C\!=\!CHCH_2O(CH_2CH_2O)_qCH_2CH\!=\!CH_2$, or $R^2{}_2C\!=\!CR^3C(O)(OCH_2CHX)_nEC(O)CR^4\!=\!CR^5$, where $R^2$ and $R^5$ are individually H or $C_1$-$C_{12}$, $R^3$ and $R^4$ are individually H, $C_1$-$C_{12}$ alkyl, or $C_2$-$C_{12}$ alkenyl group, X is H or methyl group, E is $CH_2$ or O, n is 1 to 15, and q is 1 to 15. In Scheme 1, the allylalkylene oxide may be an allylpolyethylene oxide of formula: $H_2C\!=\!CHCH_2O(CH_2CH_2O)_pCH_3$. In the above, n, m, and p indicate the individual repeat units and are not particularly limited. However, n may range from 1 to 30, p may range from 1 to 13, and q may range from 1 to 16.

The catalyst used is any of a variety of hydrosilylation catalysts. For example, the catalyst may be, but is not limited to, platinum, platinum on carbon, palladium, palladium on carbon, Raney nickel, Karsted's catalyst, and Speier's catalyst. In one embodiment, the hydrosilylation catalyst is a platinum-based catalyst such as platinum or platinum on carbon.

The lithium salt that is used in the SPEs may be any of a wide variety of lithium salts. For example, the lithium salt may be, but is not limited to, $LiClO_4$, $LiBF_4$, $LiAsF_6$, $LiSbF_6$, $LiPF_6$, $LiCF_3SO_3$, $Li(CF_3SO_2)_2N$ (Li TFSI), $Li(CF_3SO_2)_3C$, $LiC_6F_5SO_3$, $LiAlCl_4$, $LiGaCl_4$, $LiSCN$, $LiO_2$, $LiCO_2CF_3$, $LiN(SO_2C_2F_5)_2$, lithium alkyl fluorophosphates, lithium bis(oxalato) borates $Li[B(C_2O_4)_2]$ and $Li[BF_2C_2O_4]$, $Li_2B_{12}X_{12-n}H_n$, wherein X is OH, F, Cl, or Br, and n ranges from 0 to 12, or $Li_2B_{10}X_{10-n}H_n$, wherein X is OH, F, Cl, or Br, and n ranges from 0 to 10.

As introduced above, the cross-linked polysiloxane may be a solid membrane separator, a coating on the surface of the lithium anode, or a coating on the surface of a ceramic separator. Thus, when forming the polymer, the materials used to form the polymer may be combined and cast into a membrane separator. The membrane separator may be cast into a shape conducive for use as a lithium-air cell separator, or a larger sheet of the membrane may be formed with the individual separators cut or shaped into a shape conducive for use as a lithium-air cell separator.

In other embodiments, the cross-linked polysiloxane membrane may be formed as one or more layers of film on the surface of lithium anode. The films may be made to be very thin, with one or more polymer layers being formed on the lithium anode. The film thickness may be on the order of the nanometer (nm) to micrometer (μm) scale. For example, a first film may be formed on the lithium anode that is from about 1 nm to about 10 μm. A second film may then be formed on the first film, the second film having a thickness from about 1 nm to about 10 μm. Further layers of films of similar dimensions may also be formed. For example, 3, 4, 5, 6, 7, 8, 9, 10, or more layers may be formed.

The polymer layers which are formed on the lithium anode may be of varying compositions. For example, the first layer may be a softer polymer having a high ionic conductivity, while the second layer is a polymer having a higher mechanical strength. Alternatively, the first layer may be a polymer having a higher mechanical strength, while the second layer is a softer polymer having a high ionic conductivity.

The cross-linked polysiloxane membrane may be formed as one or more layers of film on the surface of a ceramic separator, particularly on the surface of the ceramic that will be proximal to the lithium anode. The films may be made to be very thin, with one or more polymer layers being formed on the ceramic. The film thickness may be on the order of the nm to μm scale. For example, a first film may be formed on the ceramic that is from about 1 nm to about 10 μm. A second film may then be formed on the first film, the second film having a thickness from about 1 nm to about 10 μm. Further layers of films of similar dimensions may also be formed. For example, 3, 4, 5, 6, 7, 8, 9, 10, or more layers may be formed.

Figure 2:
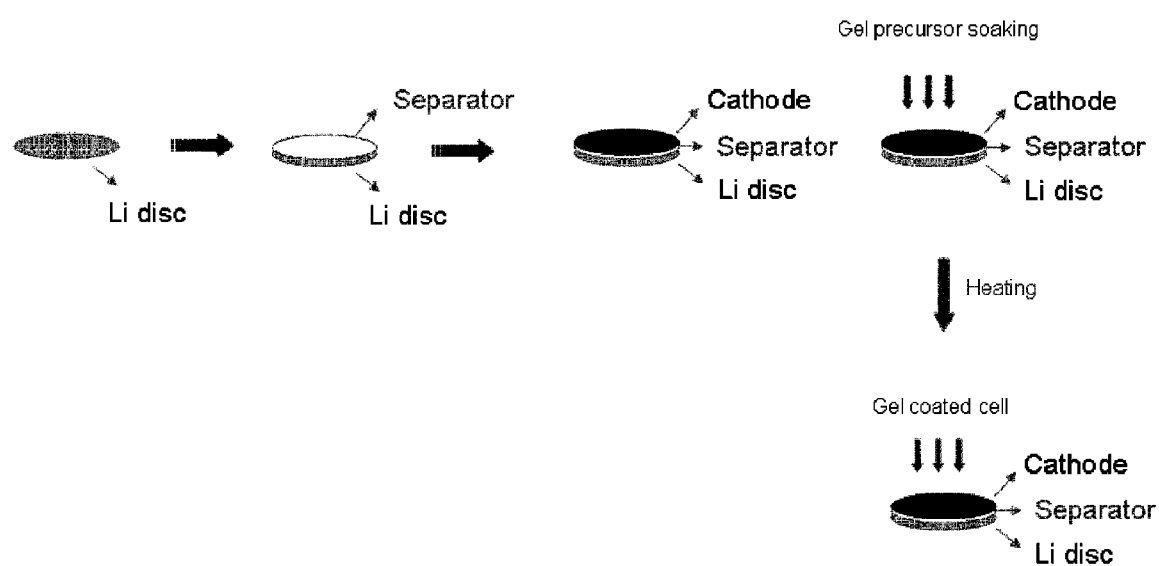
FIG. 2 is an illustration of the preparation of a lithium-air cell, according to one embodiment.

The cross-linked polysiloxane membrane may be formed on, or laminated to, a second polymeric material. The polysiloxane membrane may be cast as a sheet that is then bound with heat or an adhesive to a second film of a polymeric material. Each of the films may be made to be very thin, with one or more polymer layers being used or alternating layers of the polymer utilized. The film thickness may be on the order of the nm to μm scale, as described above with respect to the thickness of any of the above polymers. In some embodiments, a conventional porous separator may be impregnated with a polysiloxane, and then the polysiloxane is cross-linked. Thus, the convention separator may be a support, or matrix, upon which the cross-linked polysiloxane is formed. Such conventional porous separators may include polyethylene, polypropylene, or polyethyleneterephthalate separators. Formation of such a separator-cross-linked polysiloxane is illustrated in FIG. 2. In FIG. 2, the conventional separator is exposed to a precursor to the cross-linked polysiloxane to soak the convention separator. The cross-linked polysiloxane is then formed by heating the precursor soaked separator. A cathode matrix material through which the air may migrate may also be present and soaked with the polysiloxane precursor material.

The cross-linked polysiloxane may also be included in an IPN with a second polymeric material. The IPNs are formed by either blending of dissolved solutions of at least two different polymers, one of which is a polysiloxane, or by concomitant polymerization of the polymer precursors for each of the polymeric materials. For example, an illustrative IPN may be formed from a mixture of a siloxane of formula $-[Si(R^1)(H)O]_n-$, an olefinic polyethylene oxide such as $HC\!=\!CHCH_2O(CH_2CH_2O)_qCH_3$ and $HC\!=\!CHCH_2O$ $(CH_2CH_2O)_qCH_2CH\!=\!CH_2$ with a catalyst, as well as poly(meth)acrylate precursors such as $R^2C\!=\!CR^3C(O)(OCH_2CHX)_nOC(O)CR^4\!=\!CR^5$ and $R^2C\!=\!CR^3C(O)O(CH_2CH_2O)_nCH_3$ in the presence of a free radical initiator, where $R^2$ and $R^5$ are individually H or $C_1$-$C_{12}$, $R^3$ and $R^4$ are individually H, $C_1$-$C_{12}$ alkyl, or $C_2$-$C_{12}$ alkenyl group, X is H or methyl group, E is $CH_2$ or O, n' is 1 to 15, and q is 1 to 15. Such compounds are illustrated above with regard to Scheme 1. In Scheme 1, n, m, and p indicate the individual repeat units and are not particularly limited. However, n may range from 1 to 30, p may range from 1 to 13, and q may range from 1 to 16. In the IPN, the cross-linked polysiloxane forms in addition to a poly(meth)acrylate, with the polymers intertwining and potentially even forming cross-links between one another due to the structural similarity of the polymeric precursors.

The conductivity and mechanical strength of the cross-linked polysiloxane membrane films may be tuned by adjusting the cross-linking density and Si—O repeating chain length. Higher cross-linking density will increase the mechanical strength of the film while decreasing the conductivity, and lower cross-linking density will decrease the mechanical strength while increasing the conductivity.

In another aspect, process of preparing a lithium-air cell is provided. In one embodiment, the process is directed to the preparation of a lithium with a coating of cross-linked polysiloxane. The process includes coating polymer precursors and a catalyst on the surface of the lithium anode and forming a polymeric film on the surface. The process may include heating the precursors and catalyst on the surface of the anode to form the polymeric film. The heating may be conducted at a temperature suitable to initiate and support polymerization. Such a temperature may be from about 30° C. to about 150° C. In some embodiments, the temperature is from about 50° C. to about 100° C. In one embodiment, the temperature is from about 75° C. to about 80° C.

Suitable polymer precursors for the process include, but are not limited to a polysiloxane of general formula $-[Si(R^1)(H)O]_n-$ and olefinic polyethylene oxides such as $HC\!=\!CHCH_2O(CH_2CH_2O)_qCH_3$, $HC\!=\!CHCH_2O(CH_2CH_2O)_qCH_2CH\!=\!CH_2$ and $R^2C\!=\!CR^3C(O)(OCH_2CHX)_nEC(O)CR^4\!=\!CR^5$, where $R^2$ and $R^5$ are individually H or $C_1$-$C_{12}$, $R^3$ and $R^4$ are individually H, $C_1$-$C_{12}$ alkyl, or $C_2$-$C_{12}$ alkenyl group, X is H or methyl group, E is $CH_2$ or O, n' is 1 to 15, and q is 1 to 15. Such compounds are illustrated above with regard to Scheme 1. In Scheme 1, n, m, and p indicate the individual repeat units and are not particularly limited. However, n may range from 1 to 30, p may range from 1 to 13, and q may range from 1 to 16.

Suitable catalysts for use in the process include, but are not limited to, platinum, platinum on carbon, palladium, palladium on carbon, Raney nickel, Karsted's catalyst, and Speier's catalyst. In one embodiment, the hydrosilylation catalyst is a platinum-based catalyst such as platinum or platinum on carbon. In any of the methods of preparation described herein, the process may be conducted under an inert atmosphere. For example the method may be conducted in an atmosphere that includes nitrogen, helium, or argon. The atmospheric control is particularly important where the lithium anode is being directly coated so that the lithium does not react with oxygen or water in the atmosphere, at least until the battery is assembled and ready for use. Suitable free-radical initiators include, but are not limited to, aliphatic azo compounds such as 1-t-amylazo-1-cyanocyclohexane, azo-bis-isobutyronitrile and 1-t-butylazo-cyanocyclohexane, 2,2'-azo-bis-(2-methyl)butyronitrile and peroxides and hydroperoxides, such as t-butylperoctoate, t-butyl perbenzoate, dicumyl peroxide, di-t-butyl peroxide, t-butyl hydroperoxide, cumene hydroperoxide, di-t-amyl peroxide and the like. Additionally, di-peroxide initiators may be used alone or in combination with other initiators. Such di-peroxide initiators include, but are not limited to, 1,4-bis-(t-butyl peroxycarbo)cyclohexane, 1,2-di(t-butyl peroxy)cyclohexane, and 2,5-di(t-butyl peroxy)hexyne-3, and other similar initiators well known in the art. In some embodiments, the initiators are di-t-butyl peroxide and/or di-t-amyl peroxide.

The heating in the method is also conducted for a time period sufficient to polymerize the polymer precursors. The time period may be 1 minute or more. For example, the time period may be from 1 minute to 24 hours. In some embodiments, the time period is from about 0.5 hours to about 18 hours. In some embodiments, the time period is from about 1 hours to 10 hours. In further embodiments, the time period is from about 2 hours to 6 hours.

In one aspect, a process is provided for preparing lithium-air batteries with a cross-linked polysiloxane as a separator and protective barrier. The polysiloxane precursors and the reaction catalyst are to be applied onto the surface of the lithium metal, with moderate heating, to initiate the cross-linking reaction. The cross-linked film thus produced will be ionically conductive, and serve as a separator, and as an oxygen crossover barrier.

The present invention, thus generally described, will be understood more readily by reference to the following examples, which are provided by way of illustration and are not intended to be limiting of the present invention.

EXAMPLES

Example 1

Preparation of a solid polymer electrolyte (SPE) for use as a separator. An SPE is prepared according to Scheme 3.

As shown in Scheme 3, a poly(ethylene glycol) cyclic siloxane having Si—H groups is reacted with a bis-allyl-polyethylene oxide in the presence of a platinum catalyst in tetrahydrofuran (THF) solution. Also included, is a lithium salt (e.g. lithium trifluoromethanesulfonimide; Li TFSI) as a conductor in the SPE. After formation, the THF is removed by vacuum and residual monomer and solvent are removed under high vacuum (e.g. $10^{-5}$ torr) to form a solid. The solid is then heated for a period of time. For example, the solid may be heated at about 80° C. for about 12 hours until there is no Si—H peaks in the NMR and FT-IR spectra. The SPE may be cast into a membrane shape, or the SPE may be shaped after it has been prepared.

Example 2

Preparation of a cross-linked polysiloxane membrane. The same general procedure as above in Example 1 may be followed, with the SPE being a thin, membrane. Alternatively, a mixture of a siloxane polymer having Si—H groups may be reacted with both a polyalkylene glycol allyl compound, and a bis-allyl-polyethylene oxide in the presence of a platinum catalyst in a solvent, thereby forming the poly(ethylene glycol) siloxane in situ and cross-linking the material in situ. The lithium salt may be included the mixture such that it is incorporated into the filing cross-linked polysiloxane membrane. The mixture may be used to coat a lithium anode, and polymerized on the surface of the lithium, thereby forming a membrane on the anode. The process may be repeated with the coated anode to form multiple layers of the membrane on the anode.

Example 3

Preparation of a solid polymer electrolyte (SPE) for use as a separator. An SPE is prepared according to Scheme 4.

Scheme 3

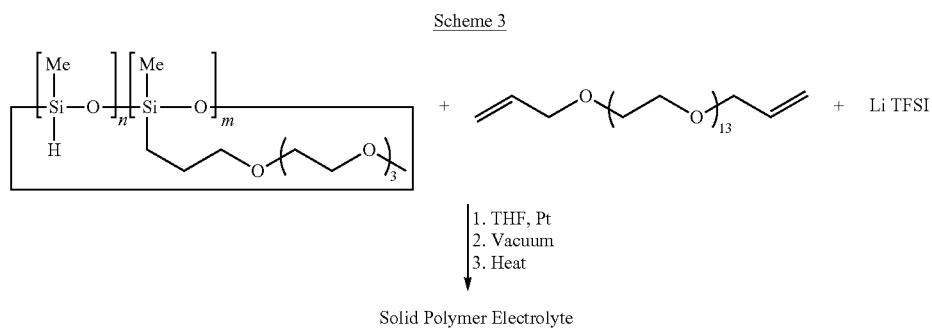

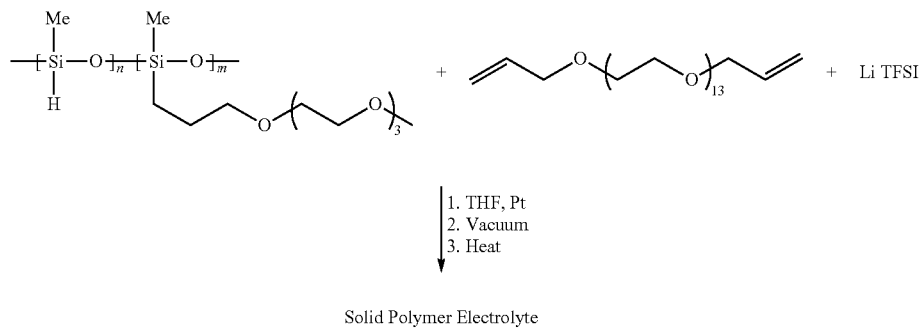

As shown in Scheme 4, a poly(ethylene glycol) linear siloxane having Si—H groups is reacted with a bis-allyl-polyethylene oxide in the presence of a platinum catalyst in tetrahydrofuran (THF) solution. Also included is a lithium salt (e.g. lithium trifluoromethanesulfonimide; Li TFSI) as a conductor in the SPE. After formation, the THF is removed by vacuum and residual monomer and solvent are removed under high vacuum (e.g. $10^{-5}$ torr) to form a solid. The solid is then heated for a period of time. For example, the solid may be heated at about 80° C. for about 8 hours until there is no Si—H peaks in the NMR and FT-IR spectra. The SPE may be cast into a membrane shape, or the SPE may be shaped after it has been prepared.

Example 4

Preparation of a solid polymer electrolyte (SPE) for use as a separator. An SPE is prepared according to Scheme 5.

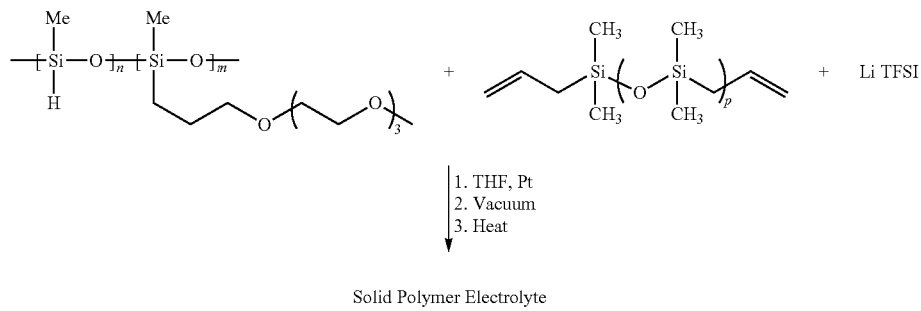

As shown in Scheme 5, a poly(ethylene glycol) linear siloxane having Si—H groups is reacted with a bis-allyl-polydimethylsiloxane in the presence of a platinum catalyst in tetrahydrofuran (THF) solution. Also included is a lithium salt (e.g. lithium trifluoromethanesulfonimide; Li TFSI) as a conductor in the SPE. After formation, the THF is removed by vacuum and residual monomer and solvent are removed under high vacuum (e.g. $10^{-5}$ torr) to form a solid. The solid is then heated for a period of time. For example, the solid may be heated at about 80° C. for about 8 hours until there is no Si—H peaks in the NMR and FT-IR spectra. The SPE may be cast into a membrane shape, or the SPE may be shaped after it has been prepared.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A lithium-air battery comprising:
   a lithium anode;
   an air cathode; and
   a separator between the lithium anode and the air cathode, the separator comprising a cross-linked polysiloxane.

2. The lithium-air battery of claim 1, wherein the separator is a coating on a surface of the lithium anode.

3. The lithium-air battery of claim 2, wherein the coating comprises one or more layers of the cross-linked polysiloxane on the surface of the lithium anode.

4. The lithium-air battery of claim 1, wherein the separator further comprises a ceramic having a first surface and second surface, and the separator is disposed in the lithium-air battery, wherein the first surface is proximal to the lithium anode, and the second surface is proximal to the air cathode.

5. The lithium-air battery of claim 4, wherein the cross-linked polysiloxane is laminated to the first surface in one or more layers of the cross-linked polysiloxane.

6. The lithium-air battery of claim 4, wherein the ceramic comprises a glass or $(Li_{1+x+y}Al_x(Ti,Ge)_{2-x}Si_yP_{3-y}O_{12})$, x is $0 \le x \le 0.4$, and y is $0 < y \le 0.6$.

7. The lithium-air battery of claim 4, wherein the ceramic is $Li_2O$—$Al_2O_3$—$SiO_2$—$P_2O_5$—$TiO_2GeO_2$.

8. A lithium-air battery comprising:
   a lithium anode;
   an air cathode; and
   a separator between the lithium anode and the air cathode, the separator comprising an interpenetrating network polymer comprising a cross-linked polysiloxane and a second, cross-linked polymer.

9. The lithium-air battery of claim 8, wherein the second, cross-linked polymer comprises a poly(meth)acrylate, a polyolefin, or a polyurethane.

10. A lithium-air battery comprising:
    a lithium anode;
    an air cathode; and
    a separator between the lithium anode and the air cathode, the separator comprising a film of a cross-linked polysiloxane and a film of a second, cross-linked polymer, wherein the films are laminated together.

11. The lithium-air battery of claim 10, wherein the second, cross-linked polymer comprises a poly(meth)acrylate, a polyolefin, or a polyurethane.

12. The lithium-air battery of claim 1, wherein the air cathode comprises a porous carbon material.

13. The lithium-air battery of claim 12, wherein the air cathode further comprises a metal oxide.

14. The lithium-air battery of claim 12, wherein the air cathode further comprises a binder.

15. The lithium air battery of claim 1, wherein the air cathode consists essentially of a porous carbon material, a catalyst of $MnO_2$, a polymer binder of PVdF, and a current collector.

16. The lithium-air battery of claim 8, wherein the separator further comprises a ceramic having a first surface and second surface, and the separator is disposed in the lithium-air battery, wherein the first surface is proximal to the lithium anode, and the second surface is proximal to the air cathode.

17. The lithium-air battery of claim 16, wherein the cross-linked polysiloxane is laminated to the first surface in one or more layers of the cross-linked polysiloxane.

18. The lithium-air battery of claim 16, wherein the ceramic comprises a glass or $(Li_{1+x+y}Al_x(Ti,Ge)_{2-x}Si_yP_{3-y}O_{12})$, x is $0 \le x \le 0.4$, and y is $0 < y \le 0.6$.

19. The lithium-air battery of claim 16, wherein the ceramic is $Li_2O$—$Al_2O_3$—$SiO_2$—$P_2O_5$—$TiO_2GeO_2$.

20. The lithium-air battery of claim 8, wherein the separator is a coating on a surface of the lithium anode.

21. The lithium-air battery of claim 20, wherein the coating comprises one or more layers of the cross-linked polysiloxane on the surface of the lithium anode.

22. The lithium-air battery of claim 10, wherein the separator is a coating on a surface of the lithium anode.

23. The lithium-air battery of claim 22, wherein the coating comprises one or more layers of the cross-linked polysiloxane on the surface of the lithium anode.

24. The lithium-air battery of claim 10, wherein the separator further comprises a ceramic having a first surface and second surface, and the separator is disposed in the lithium-air battery, wherein the first surface is proximal to the lithium anode, and the second surface is proximal to the air cathode.

25. The lithium-air battery of claim 24, wherein the ceramic comprises a glass or $(Li_{1+x+y}Al_x(Ti,Ge)_{2-x}Si_yP_{3-y}O_{12})$, x is $0 \le x \le 0.4$, and y is $0 < y \le 0.6$.

26. The lithium-air battery of claim 24, wherein the ceramic is $Li_2O$—$Al_2O_3$—$SiO_2$—$P_2O_5$—$TiO_2GeO_2$.

* * * * *